United States Patent [19]
Robertson

[11] Patent Number: 5,813,619
[45] Date of Patent: Sep. 29, 1998

[54] FILM ASSEMBLAGE

[75] Inventor: Jeffrey C. Robertson, Rochester, N.Y.

[73] Assignee: Eastman Kodak Company, Rochester, N.Y.

[21] Appl. No.: 835,937

[22] Filed: Apr. 9, 1997

[51] Int. Cl.$^6$ ................................................ B65H 18/28
[52] U.S. Cl. ...................... 242/160.4; 242/580; 242/582; 242/583; 430/501
[58] Field of Search ................................ 242/160.4, 583, 242/582, 580, 348, 348.1, 348.2, 348.3, 348.4; 396/512, 513, 514, 515, 516; 430/500, 501; 156/187, 446, 447

[56] References Cited

U.S. PATENT DOCUMENTS

| | | | |
|---|---|---|---|
| 1,332,890 | 3/1920 | Fallesen et al. | 430/501 |
| 2,188,779 | 1/1940 | Roehrl | 430/501 |
| 2,578,283 | 12/1951 | Bornemann et al. | 242/583 |
| 2,900,868 | 8/1959 | Gaffney, Jr. | 242/583 |
| 3,099,560 | 7/1963 | Kouri | 430/501 |
| 3,321,149 | 5/1967 | Andersen et al. | 242/583 |
| 3,499,376 | 3/1970 | Swift | 242/579 |
| 3,503,568 | 3/1970 | Galley | 242/583 |
| 3,756,528 | 9/1973 | Ohmura | 242/583 |
| 5,340,051 | 8/1994 | Goodfellow | 242/583 |

Primary Examiner—John M. Jillions
Attorney, Agent, or Firm—Roger A. Fields

[57] ABSTRACT

A film assemblage comprising a spool core, and a filmstrip, a film leader and a film trailer which are to be wound as a single longitudinal strip on the spool core in a roll with the filmstrip extending between the film leader and the film trailer in order that the film leader, the filmstrip and the film trailer form a common inner side of the roll and a common outer side of the roll, is characterized in that the film trailer has a discrete cohesive patch located to be on the inner side of the roll and a discrete cohesive patch located to be on the outer side of the roll, which can only stick to one another other and not to the inner or outer sides of the roll, and which are spaced apart along the film trailer a distance substantially equal to the circumference of the roll, whereby when the film leader, the filmstrip and the film trailer are wound on the spool core with the film trailer being an innermost convolution of the roll and the film leader being an outermost convolution of the roll the cohesive patches will be separate from each other to prevent them from sticking to one another, but when the film leader, the filmstrip and the film trailer are wound on the spool core with the film leader being the innermost convolution of the roll and the film trailer being the outermost convolution of the roll the cohesive patches will be facing each other to stick to one another.

11 Claims, 7 Drawing Sheets

5,813,619

FILM ASSEMBLAGE

FIELD OF THE INVENTION

The invention relates generally to the field of photography, and in particular to a film assemblage.

BACKGROUND OF THE INVENTION

It is conventional for a film assemblage to comprise a film supply spool, and a filmstrip, a film leader and a film trailer which are to be wound as a single longitudinal strip on the film supply spool in a roll. The filmstrip extends between the film leader and the film trailer in order that the film leader, the filmstrip and the film trailer form a common inner side of the roll and a common outer side of the roll. The film leader is at least the outermost convolution of the roll, and the film trailer is at least the innermost convolution of the roll. The emulsion side of the filmstrip is along the inner side of the roll. The inner side of the roll may be coated with a pressure-sensitive adhesive at the film trailer to adhere the film trailer to the spool core, and at the film leader to adhere the film leader to the next inner convolution of the roll to maintain the roll intact and prevent it from uncoiling.

SUMMARY OF THE INVENTION

According to the invention, a film assemblage comprising a spool core, and a filmstrip, a film leader and a film trailer which are to be wound as a single longitudinal strip on the spool core in a roll with the filmstrip extending between the film leader and the film trailer in order that the film leader, the filmstrip and the film trailer form a common inner side of the roll and a common outer side of the roll, is characterized in that:

the film trailer has a discrete cohesive patch located to be on the inner side of the roll and a discrete cohesive patch located to be on the outer side of the roll, which can only stick to one another other and not to the inner or outer sides of the roll, and which are spaced apart along the film trailer a distance substantially equal to the circumference of the roll, whereby when the film leader, the filmstrip and the film trailer are wound on the spool core with the film trailer being an innermost convolution of the roll and the film leader being an outermost convolution of the roll the cohesive patches will be separate from each other to prevent them from sticking to one another, but when the film leader, the filmstrip and the film trailer are wound on the spool core with the film leader being the innermost convolution of the roll and the film trailer being the outermost convolution of the roll the cohesive patches will be facing each other to stick to one another.

Also, the spool core has a cohesive ring and the film leader has a discrete cohesive patch located to be on the inner side of the roll, which can only stick to one another and not to the inner or outer sides of the roll, and which are positioned on the spool core and on the film leader in a way that when the film leader, the filmstrip and the film trailer are wound on the spool core with the film trailer being the innermost convolution of the roll and the film leader being the outermost convolution of the roll the cohesive ring and the cohesive patch will be separate from each other to prevent them from sticking to one another, but when the film leader, the filmstrip and the film trailer are wound on the spool core with the film leader being the innermost convolution of the roll and the film trailer being the outermost convolution of the roll the cohesive ring and the cohesive patch will be facing each other to stick to one another.

DETAILED DESCRIPTION OF THE INVENTION

Figure 3:
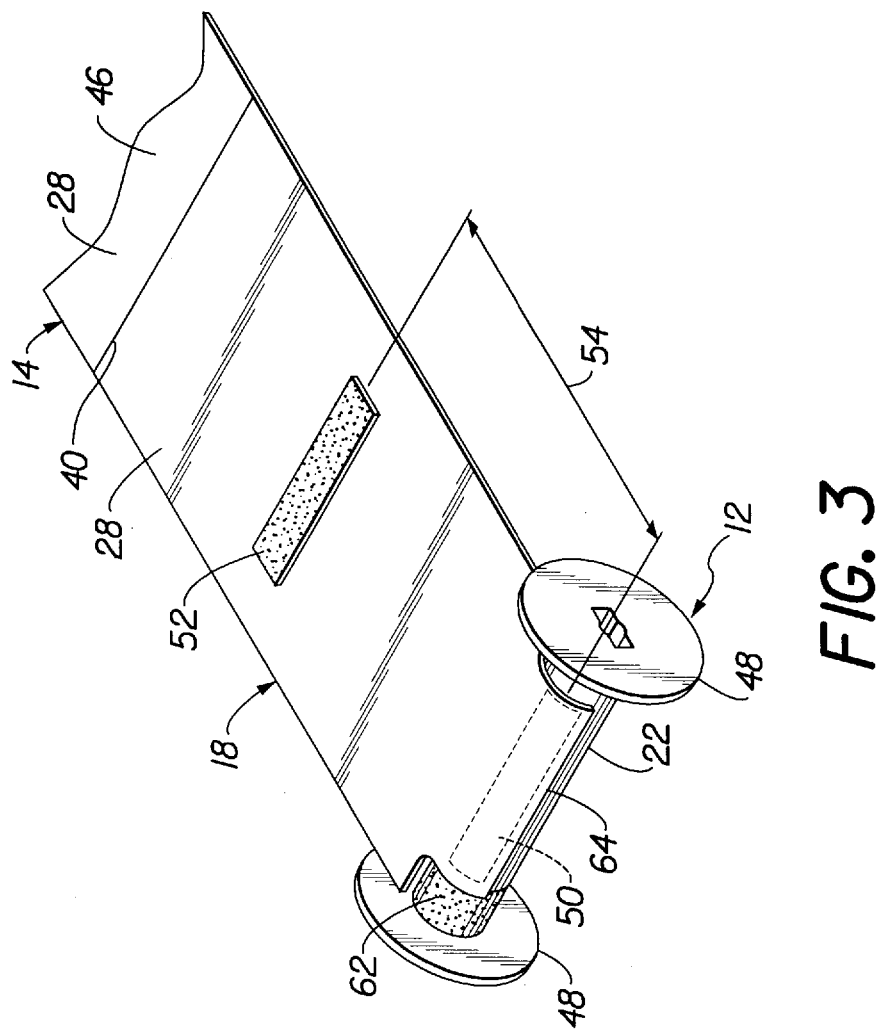
FIG. 3 is a perspective view of a film supply spool and the film trailer.
Figure 4:
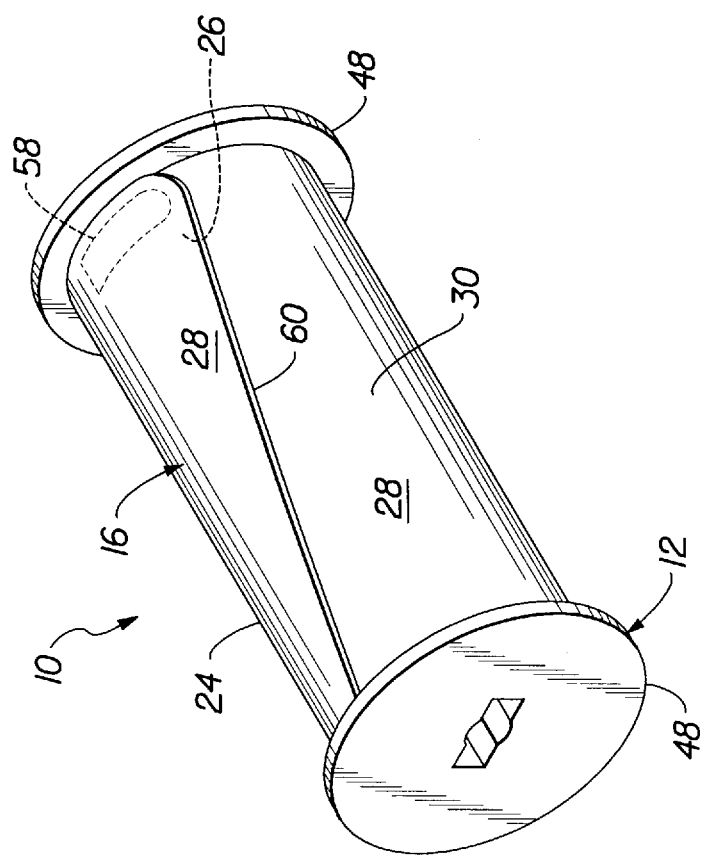
FIG. 4 is a perspective view of the film leader, the filmstrip and the film trailer rolled on the film supply spool with the film leader being on the outside of the roll and the film trailer being on the inside of the roll.
Figure 5:
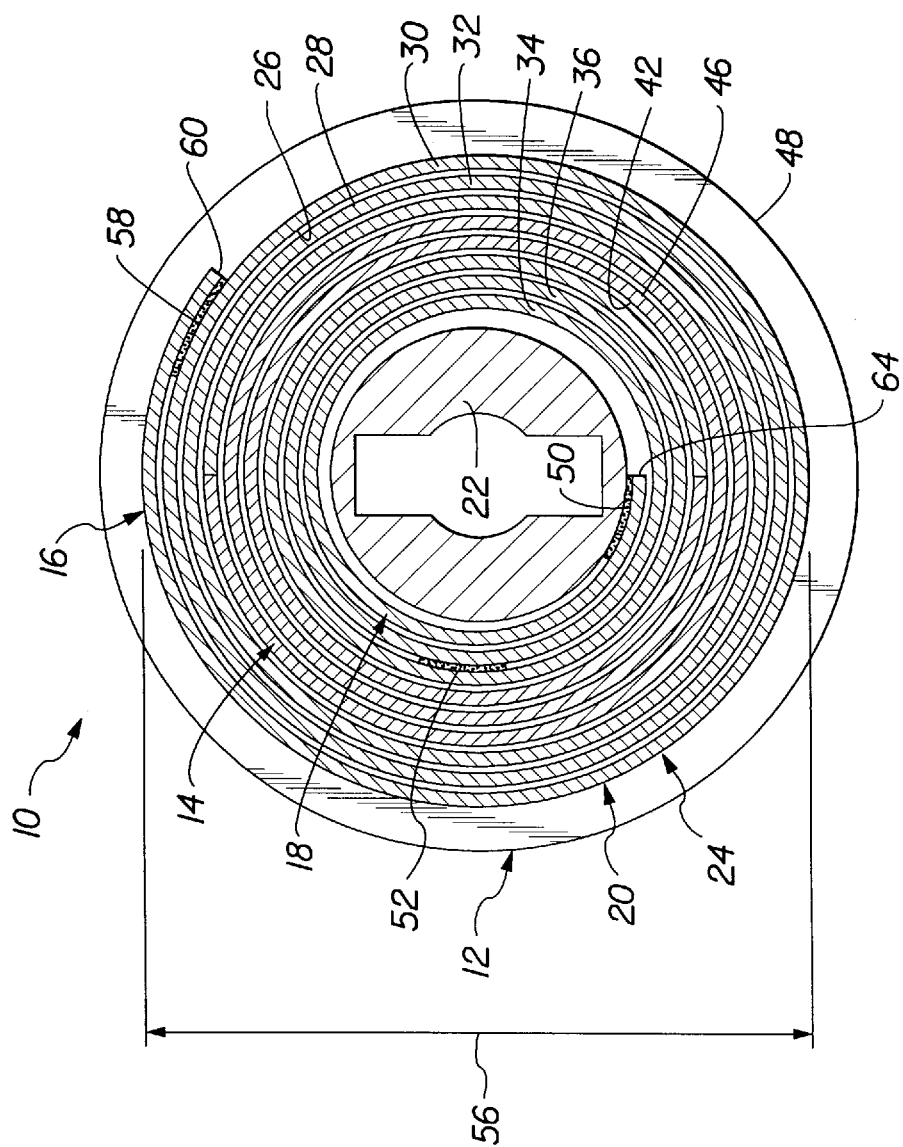
FIG. 5 is a cross-section of the film leader, the filmstrip and the film trailer rolled on the film supply spool with the film leader being on the outside of the roll and the film trailer being on the inside of the roll.

Referring now to the drawings, FIGS. 1–5 show a film assemblage 10 comprising a film supply spool 12, and an unexposed filmstrip 14, a film leader 16 and a film trailer 18. The filmstrip 14, the film leader 16 and the film trailer 18 are wound as a single longitudinal strip 20 on a spool core 22 of the film supply spool 12, in a multi-convolution roll 24. The filmstrip 14 longitudinally extends between the film leader 16 and the film trailer 18 in order that the film leader, the filmstrip and the film trailer form a common inner side 26 of the roll 24 and a common outer side 28 of the roll. As shown in FIG. 5, the film leader 16 constitutes at least the outermost convolution 30 of the roll 24 and the next inward convolution 32 of the roll, and the film trailer 18 constitutes at least the innermost convolution 34 of the roll and the next outward convolution 36 of the roll.

Figure 8:
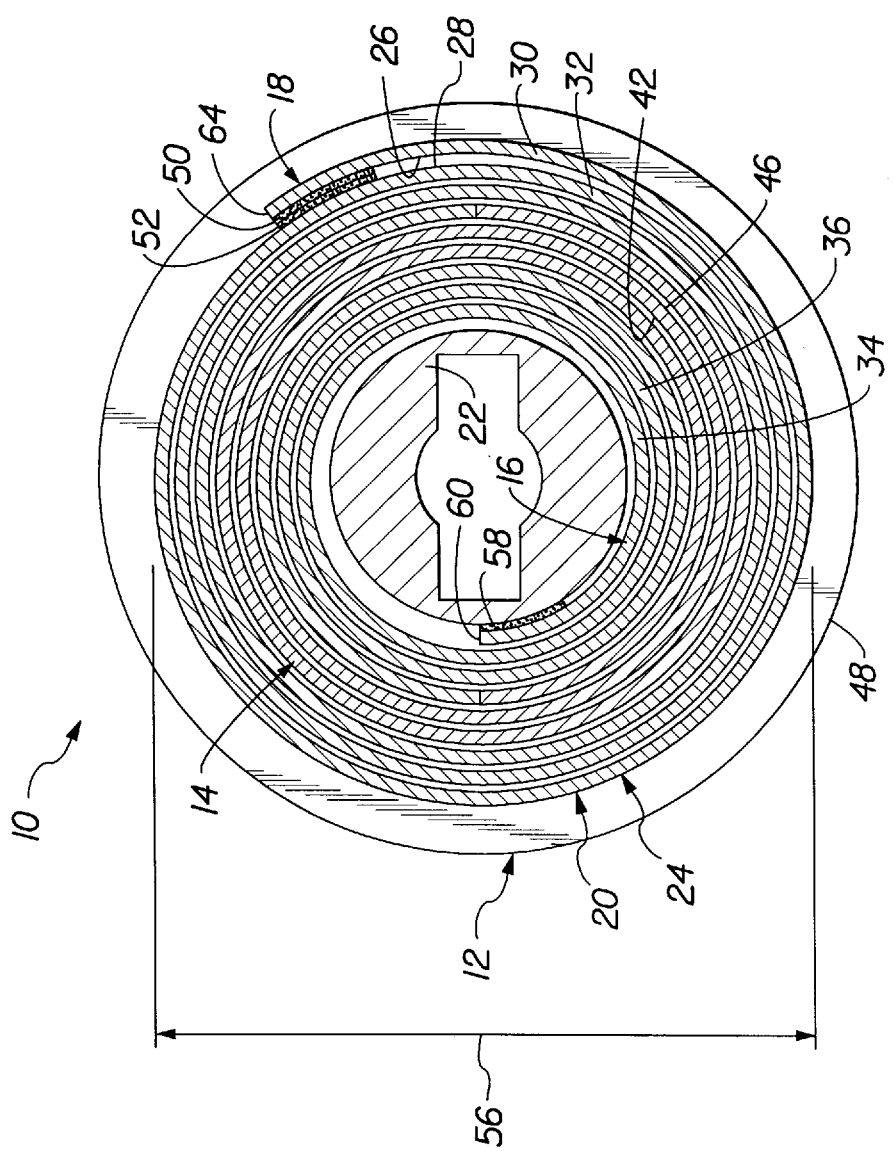
FIG. 8 is a cross-section of the film leader, the filmstrip and the film trailer rolled on the film supply spool with the film leader being on the inside of the roll and the film trailer being on the outside of the roll.

Alternatively, as shown in FIG. 8, the filmstrip 14, the film leader 16 and the film trailer 18 can be wound on the spool core 22 of an empty (second) supply spool 12, with the film leader 16 then being at least the innermost convolution 34 of the roll 24 and the next outward convolution 36 of the roll, and with the film trailer 18 then being at least the outermost convolution 30 of the roll and the next inward convolution 32 of the roll. In this instance, the roll 24 is reverse wound as compared to FIG. 5, and the empty (second) supply spool 12 is used as a film take-up spool for receiving the film leader 16, the filmstrip 14 and the film trailer 18 from the original (first) supply spool 12.

Figure 1:
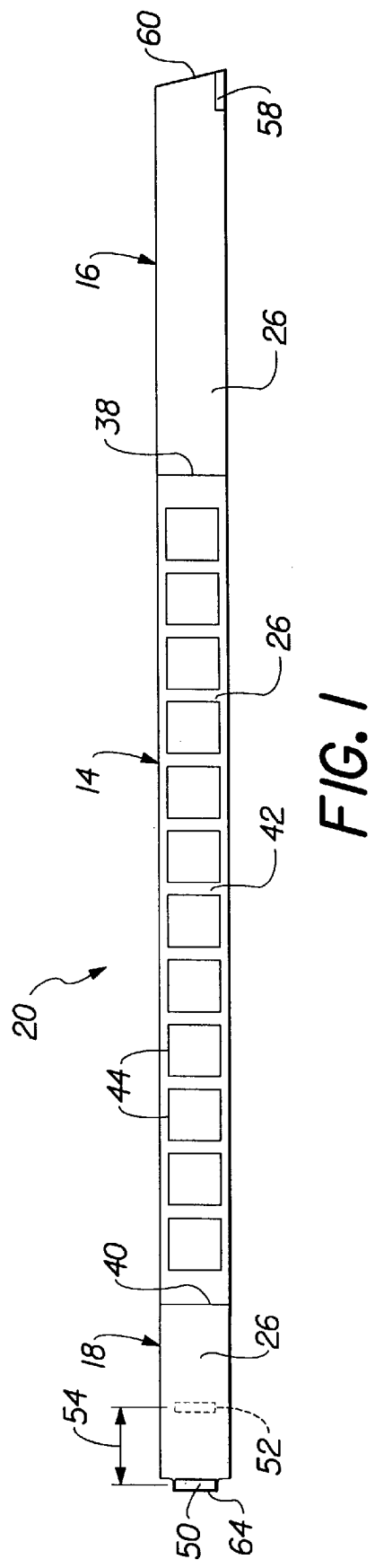
FIG. 1 is a plan view of the film leader, the filmstrip and the film trailer pursuant to a preferred embodiment of the invention, depicting one side of the film leader, the filmstrip and the film trailer.
Figure 2:
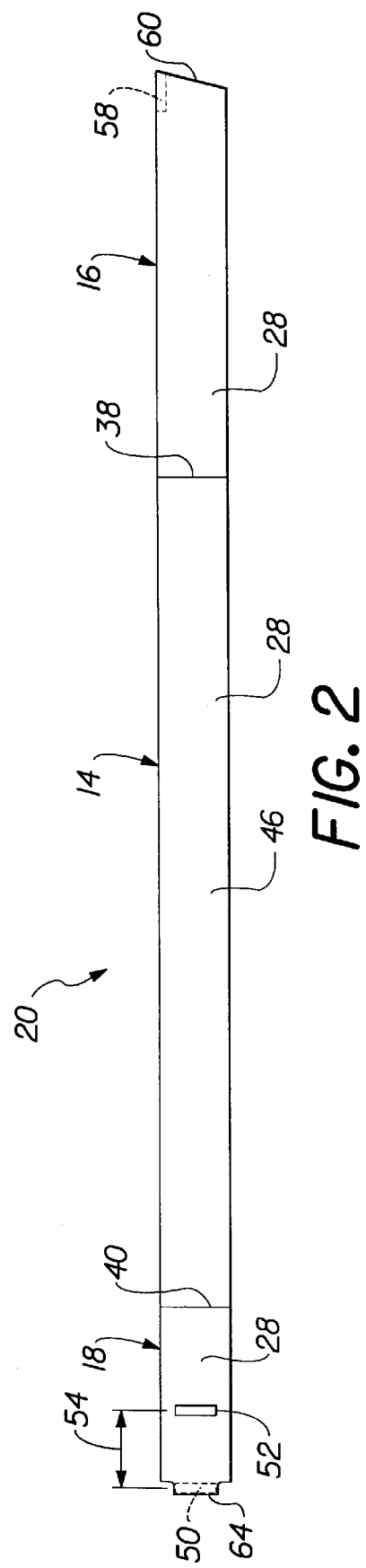
FIG. 2 is a plan view similar to FIG. 1, depicting a reverse side of the film leader, the filmstrip and the film trailer.

As shown in FIGS. 1 and 2, filmstrip 14 is connected to the film leader 16 and to the film trailer 18 at respective butt splices or joints 38 and 40 to form the single longitudinal strip 20. However, the film leader 16 and the film trailer 18 can be integral end-extensions of the filmstrip 14. The filmstrip 14 has an emulsion side 42 on which a predetermined number of latent images 44 are to be successively exposed in a camera (not shown), and a non-emulsion side 46. The emulsion side 42 of the filmstrip 14 is the film portion of the inner side 26 of the roll 24, and the non-emulsion side 46 is the film portion of the outer side 28 of the roll, when the film leader 16, the filmstrip and the film trailer 18 are wound on the spool core 22 with the film trailer being the innermost convolution 34 of the roll and the film leader being the outermost convolution 30 of the roll as shown in FIG. 5, and when the film leader, the filmstrip and the film trailer are wound on the spool core with the film leader being the innermost convolution of the roll and the film trailer being the outermost convolution of the roll as shown in FIGS. 8.

Figure 7:
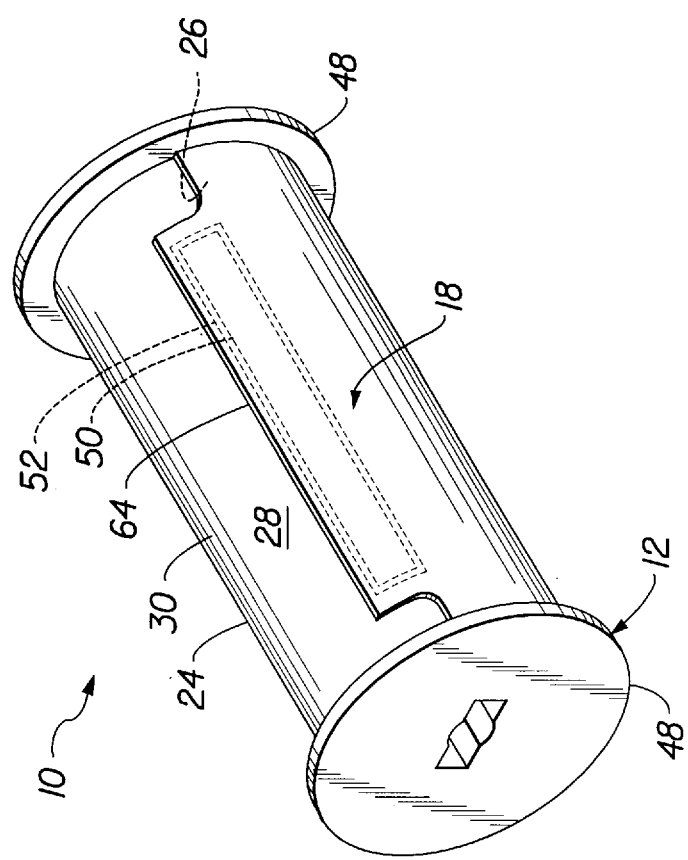
FIG. 7 is a perspective view of the film leader, the filmstrip and the film trailer rolled on the film take-up spool with the film leader being on the inside of the roll and the film trailer being on the outside of the roll.

The film leader 16 and the film trailer 18 are constructed of carbon black polyethylene, polypropylene or other known material to be impervious to ambient light and to be substantially impervious to moisture, to protect the filmstrip 14 when the film leader 16, the filmstrip and the film trailer 18 are wound on the spool core 22 with the film trailer being the innermost convolution 34 of the roll 24 and the film leader being the outermost convolution 30 of the roll as shown in FIGS. 4 and 5, and when the film leader, the filmstrip and the film trailer are wound on the spool core with the film leader being the innermost convolution of the roll and the film trailer being the outermost convolution of the roll as shown in FIGS. 7 and 8. The film leader 16 and the film trailer 18 are slightly wider than the filmstrip 14. A pair of identical flanges 48 of the film supply 12 are spaced apart a distance slightly greater than the width of the filmstrip 14 and slightly less than the common width of the film leader 16 and the film trailer 18, to provide a slight interference fits between the flanges and the film leader and between the flanges and the film trailer. See FIGS. 4 and 7. Like the film leader 16 and the film trailer 18, the film supply spool 12 is constructed of carbon black polyethylene, polypropylene or other known material to be impervious to ambient light and to be substantially impervious to moisture. This provides increased protection for the roll 24.

The film trailer 18 has a discrete known-type cohesive patch 50 located to be on the inner side 26 of the roll 24 and a discrete similar cohesive patch 52 located to be on the outer side 28 of the roll, which can only stick to one another other and not to the inner or outer sides of the roll. The two cohesive patches 50 and 52 of the film trailer 18 are spaced apart at the opposite sides of the film trailer a distance 54 as shown in FIGS. 1-3. The distance 54 is substantially equal to the ratio of the circumference of the roll 24 to the diameter 56 of the roll times the diameter of the roll. See FIGS. 5 and 8. Stated more simply, the distance 54 is substantially equal to the circumference of the roll 54, i.e. the length of its outermost convolution 30. Consequently, when the film leader 16, the filmstrip 14 and the film trailer 18 are wound on the spool core 22 with the film trailer being the innermost convolution 34 of the roll 24 and the film leader being the outermost convolution 32 of the roll, the cohesive patches 50 and 52 will be separate from each other to prevent them from sticking to one another as shown in FIG. 5. However, when the film leader 16, the filmstrip 14 and the film trailer 18 are wound on the spool core 22 with the film leader being the innermost convolution 34 of the roll 24 and the film trailer being the outermost convolution 30 of the roll, the cohesive patches 50 and 52 will be facing each other to stick to one another as shown in FIGS. 7 and 8.

The film leader 16 has a discrete known-type cohesive patch 58 which is located to be on the inner side 26 of the roll 24 and is positioned adjacent an inclined end edge 60 of the film leader. See FIGS. 1, 4 and 5. The single cohesive patch 58 of the film leader 16 is similar to the two cohesive patches 50 and 52 of the film trailer 18, in that it can only stick to another cohesive patch and not to the inner or outer sides 26 and 28 of the roll 24.

The spool core 22 has a known-type cohesive ring 62 similar to the two cohesive patches 50 and 52 of the film trailer 18 and to the single cohesive patch 58 of the film leader 16, in that it cannot stick to the inner or outer sides 26 and 28 of the roll 24. The cohesive ring 62 is positioned adjacent one of the flanges 48 as shown in FIG. 3.

The cohesive patch 50 of the film trailer 18 that is located to be on the inner side 26 of the roll 24 is positioned adjacent a clipped-corners end edge 64 of the film trailer, and is arranged to be rolled on the spool core 22 spaced from the cohesive ring 62 of the spool core when the film leader 16, the filmstrip 14 and the film trailer are wound on the spool core with the film trailer being the innermost convolution 34 of the roll and the film leader being the outermost convolution 30 of the roll. See FIGS. 1-3 and 5. This prevents the cohesive patch 50 and the cohesive ring 62 from sticking to each other.

The cohesive patch 52 of the film trailer 18 that is located to be on the outer side 28 of the roll 24 is spaced from the end edge 64 of the film trailer the distance 54, and therefor cannot be stuck to the cohesive ring 62 when the film leader 16, the filmstrip 14 and the film trailer are wound on the spool core 22 with the film trailer being the innermost convolution 34 of the roll and the film leader being the outermost convolution 30 of the roll. See FIGS. 1-3 and 5.

Figure 6:
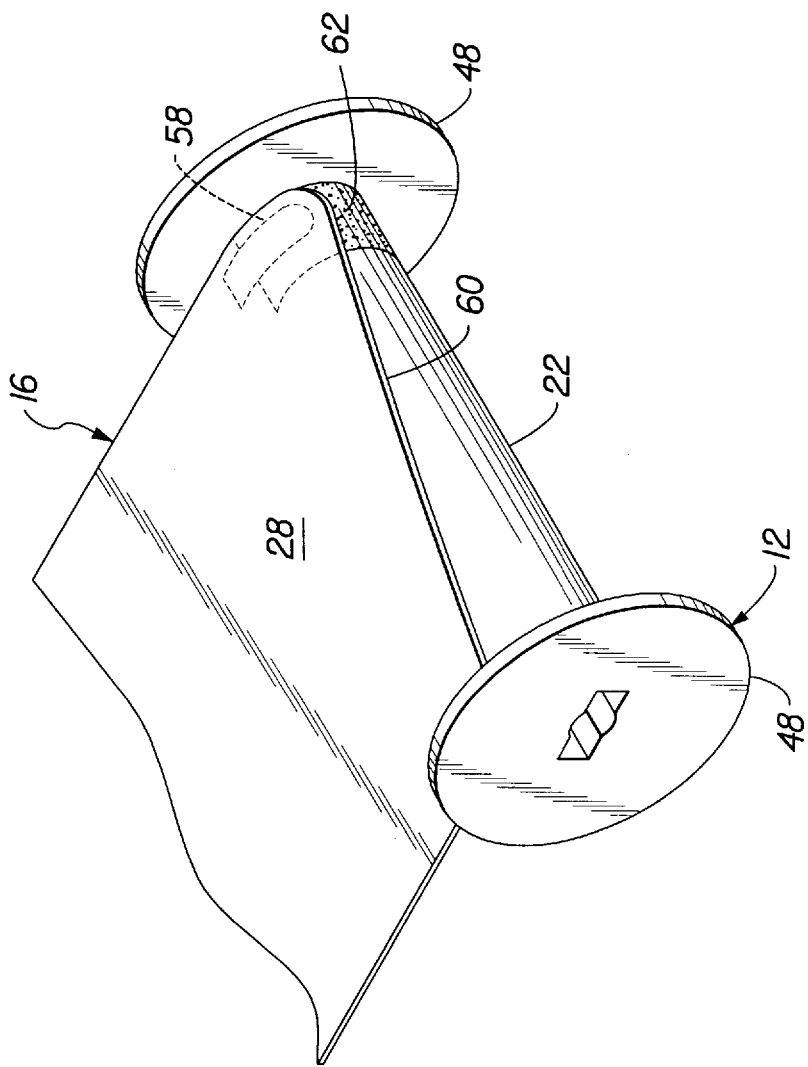
FIG. 6 is a perspective view of a film take-up spool and the film leader.

The cohesive patch 58 of the film leader 16 is separated from the cohesive ring 62 of the spool core 22 to prevent them from sticking to one another when the film leader, the filmstrip 14 and the film trailer 18 are wound on the spool core with the film trailer being the innermost convolution 34 of the roll and the film leader being the outermost convolution 30 of the roll. See FIGS. 4 and 5. Conversely, as shown in FIGS. 6 and 8, when the film leader 16, the filmstrip 14 and the film trailer 18 are wound on the spool core 22 with the film leader being the innermost convolution 34 of the roll and the film trailer being the outermost convolution 30 of the roll the cohesive ring 62 and the cohesive patch 58 will be facing each other to stick to one another.

The invention has been described with reference to a preferred embodiment. However, it will be appreciated that variations and modifications can be effected by a person of ordinary skill in the art without departing from the scope of the invention.

PARTS LIST 10. film assemblage
12. film supply/take-up spool
14. filmstrip
16. film leader
18. film trailer
20. single longitudinal strip
22. spool core
24. multi-convolution roll
26. inner roll side
28. outer roll side
30. outermost roll convolution
32. next inward convolution
34. innermost roll convolution
36. next outward convolution
38. butt splice
40. butt splice
42. emulsion side 44. latent images
46. non-emulsion side
48. spool flanges
50. trailer cohesive patch
52. trailer cohesive patch
54. patch distance
56. roll diameter
58. leader cohesive patch
60. leader end edge
62. core cohesive ring
64. trailer end edge

What is claimed is:

1. A film assemblage comprising a spool core, and a filmstrip, a film leader and a film trailer which are to be wound as a single longitudinal strip on said spool core in a roll with said filmstrip extending between said film leader and said film trailer in order that the film leader, the filmstrip and the film trailer form a common inner side of the roll and a common outer side of the roll, is characterized in that:

said film trailer has a discrete cohesive patch located to be on the inner side of the roll and a discrete cohesive patch located to be on the outer side of the roll, which can only stick to one another other and not to the inner or outer sides of the roll, and which are spaced apart along the film trailer a distance substantially equal to the circumference of the roll, whereby when said film leader, said filmstrip and said film trailer are wound on said spool core with the film trailer being an innermost convolution of the roll and the film leader being an outermost convolution of the roll said cohesive patches will be separate from each other to prevent them from sticking to one another, but when said film leader, said filmstrip and said film trailer are wound on said spool core with the film leader being the innermost convolution of the roll and the film trailer being the outermost convolution of the roll said cohesive patches will be facing each other to stick to one another.

2. A film assemblage as recited in claim 1, wherein said spool core has a cohesive ring and said film leader has a discrete cohesive patch located to be on the inner side of the roll, which can only stick to one another and not to the inner or outer sides of the roll, and which are positioned on said spool core and on said film leader in a way that when said film leader, said filmstrip and said film trailer are wound on said spool core with the film trailer being the innermost convolution of the roll and the film leader being the outermost convolution of the roll the cohesive ring and the cohesive patch will be separate from each other to prevent them from sticking to one another, but when said film leader, said filmstrip and said film trailer are wound on said spool core with the film leader being the innermost convolution of the roll and the film trailer being the outermost convolution of the roll the cohesive ring and the cohesive patch will be facing each other to stick to one another.

3. A film assemblage as recited in claim 2, wherein said cohesive ring of the spool core and said cohesive patch of said film trailer that is located to be on the inner side of the roll are positioned on the spool core and on the film trailer in a way to prevent the cohesive ring and the cohesive patch from sticking to one another when said film leader, said filmstrip and said film trailer are wound on said spool core with the film trailer being the innermost convolution of the roll and the film leader being the outermost convolution of the roll.

4. A film assemblage as recited in claim 3, wherein said cohesive ring of the spool core is positioned on the spool core adjacent one end of said spool core, and said cohesive patch of said film trailer that is located to be on the inner side of the roll is positioned on the film trailer to be rolled on said spool core separate from said cohesive ring when said film leader, said filmstrip and said film trailer are wound on said spool core with the film trailer being the innermost convolution of the roll and the film leader being the outermost convolution of the roll.

5. A film assemblage as recited in claim 1, wherein said film leader and said film trailer are opaque to be impervious to light and are constructed to be substantially impervious to moisture to protect the filmstrip when said film leader, said filmstrip and said film trailer are wound on said spool core with the film trailer being the innermost convolution of the roll and the film leader being the outermost convolution of the roll and when said film leader, said filmstrip and said film trailer are wound on said spool core with the film leader being the innermost convolution of the roll and the film trailer being the outermost convolution of the roll.

6. A film assemblage comprising a filmstrip and an end strip which are to be wound as a single longitudinal strip in a roll in order that the filmstrip and the end strip form a common inner side of the roll and a common outer side of the roll, is characterized in that:

said end strip has a discrete cohesive patch located to be on the inner side of the roll and a discrete cohesive patch located to be on the outer side of the roll, which can only stick to one another and not to the inner or outer sides of the roll, and which are spaced apart along said end strip a distance substantially equal to the circumference of the roll, whereby when said filmstrip and said end strip are wound in the roll with the end strip being an innermost convolution of the roll said cohesive patches will be separate from each other to prevent them from sticking to one another, but when said filmstrip and said end strip are wound in the roll with the end strip being an outermost convolution of the roll said cohesive patches will be facing each other to stick to one another.

7. A film assemblage as recited in claim 6, wherein said filmstrip has an emulsion side and a non-emulsion side, said cohesive patch of said end strip that is located to be on the inner side of the roll is positioned on the same side of the end strip as said emulsion side of the filmstrip, and said cohesive patch of said end strip that is located to be on the outer side of the roll is positioned on the same side of the end strip as said non-emulsion side of the filmstrip.

8. A film assemblage as recited in claim 6, wherein said end strip has an end edge remote from said filmstrip, said cohesive patch of said end strip that is located to be on the inner side of the roll is positioned on the end strip adjacent said end edge, and said cohesive patch of said end strip that is located to be on the outer side of the roll is positioned on the end strip spaced from said end edge the distance substantially equal to the ratio of the circumference of the roll to the diameter of the roll times the diameter of the roll.

9. A film roll comprising a filmstrip and an end strip which are rolled as a single longitudinal strip with said end strip being an innermost convolution in order that said filmstrip and said end strip form a common inner side of said film roll and a common outer side of the film roll, is characterized in that:

said end strip has a discrete cohesive patch on said inner side of the film roll and a discrete cohesive patch on said outer side of the film roll, which can only stick to one another other and not to said inner or outer sides of the film roll, and which are spaced apart along the end strip in a way that when said filmstrip and said end strip are wound in said film roll with the end strip being an innermost convolution of the film roll said cohesive patches will be separated from each other to prevent them from sticking to one another, but when said filmstrip and said end strip are wound in said film roll with the end strip being an outermost convolution of the film roll said cohesive patches will be facing each other to stick to one another.

11. A film assemblage comprising a spool core, and a filmstrip and an end strip which are to be wound as a single longitudinal strip on said spool core in a roll in order that the filmstrip and the end strip form a common inner side of the roll and a common outer side of the roll, is characterized in that:

said spool core has a cohesive ring and said end strip has a discrete cohesive patch located to be on the inner side of the roll, which can only stick to one another and not to the inner or outer sides of the roll, and which are positioned on said spool core and on said end strip in a way that when said end strip and said filmstrip are wound on said spool core with the end strip being the outermost convolution of the roll the cohesive ring and the cohesive patch will be separate from each other to prevent them from sticking to one another, but when said end strip and filmstrip are wound on said spool core with the end strip being the innermost convolution of the roll the cohesive ring and the cohesive patch will be facing each other to stick to one another.

10. A film roll as recited in claim 9, wherein said cohesive patch of the end strip that is located to be on said inner side of the film roll and said cohesive patch of the end strip that is located to be on the outer side of the film roll are spaced apart along said end strip a distance substantially equal to the circumference of the film roll.

\* \* \* \* \*